(12) United States Patent
Kimura et al.

(10) Patent No.: US 6,437,456 B1
(45) Date of Patent: Aug. 20, 2002

(54) POWER OUTPUT APPARATUS, HYBRID VEHICLE EQUIPPED WITH THE SAME AND METHOD FOR CONTROLLING OPERATING POINT OF ENGINE

(75) Inventors: Akihiro Kimura; Tetsuya Abe, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/789,589

(22) Filed: Feb. 22, 2001

(51) Int. Cl.[7] .............................. F02N 11/06; H02P 9/04
(52) U.S. Cl. ............................................... 290/40 C
(58) Field of Search ............................. 290/40 A, 40 D, 290/40 R, 7

(56) References Cited

U.S. PATENT DOCUMENTS

| | | | | |
|---|---|---|---|---|
| 4,021,677 A | * | 5/1977 | Rosen et al. ............... | 290/40 R |
| 4,649,878 A | * | 3/1987 | Otobe et al. ............ | 123/339.18 |
| 5,355,972 A | * | 10/1994 | Wataya ........................ | 180/68.3 |
| 5,528,901 A | * | 6/1996 | Willis ........................... | 60/626 |
| 5,629,568 A | * | 5/1997 | Mertens ....................... | 290/40 R |
| 5,839,530 A | * | 11/1998 | Dietzel ........................ | 180/65.4 |
| 5,925,993 A | * | 7/1999 | Lansberry .................... | 318/139 |
| 5,978,719 A | * | 11/1999 | Yano et al. .................... | 701/22 |
| 6,067,801 A | * | 5/2000 | Harada et al. ................ | 60/705 |
| 6,073,712 A | * | 6/2000 | Buglione ..................... | 180/65.2 |
| 6,203,468 B1 | * | 3/2001 | Nitta et al. ...................... | 477/5 |
| 6,208,034 B1 | * | 3/2001 | Yamaguchi ................. | 290/40 C |
| 6,232,733 B1 | * | 5/2001 | Obayashi et al. ........... | 318/432 |
| 6,282,481 B1 | * | 8/2001 | Hosomi ........................ | 701/84 |
| 6,307,277 B1 | * | 10/2001 | Tamai et al. ............... | 290/40 C |
| 6,340,847 B1 | * | 1/2002 | Kawabata et al. ......... | 290/40 C |

* cited by examiner

Primary Examiner—Nicholas Ponomarenko
Assistant Examiner—Pedro J. Cuevas
(74) Attorney, Agent, or Firm—Oliff & Berridge, PLC (57) ABSTRACT

In this power output apparatus, an operation line lower in torque than the maximum torque line is adopted as a reference operation line for moving the motor operating point along the reference operation line in a steady state, and for controlling the motor operating point such that the power output from the motor becomes the required power by increasing the motor torque while substantially maintaining the motor rotation speed irrespective of the reference operation line when the power required of the motor increases.

Therefore, according to this power output apparatus, even when the power required of the motor increases suddenly, the motor torque increases without increasing the motor rotation speed and the power output from the motor becomes equal to the required power immediately.

6 Claims, 7 Drawing Sheets

POWER OUTPUT APPARATUS, HYBRID VEHICLE EQUIPPED WITH THE SAME AND METHOD FOR CONTROLLING OPERATING POINT OF ENGINE

BACKGROUND OF THE INVENTION

1. Field of the Invention

The invention relates to a power output apparatus used for a hybrid vehicle or the like, and more particularly, to a power output apparatus comprising a motor for outputting power, a generator for generating electric power using at least part of the power output by this motor, and an electric motor operated so that the power output to a drive shaft becomes a desired power using the generated electric power or the electric power accumulated after power generation, a hybrid vehicle equipped with the power output apparatus and a method for controlling the operating point of motor.

2. Description of the Related Art

In recent years, various configurations of so-called hybrid vehicles have been proposed for dramatically improving the fuel consumption and exhaust gas purification performance of motors such as gasoline reciprocating engines for outputting power by fuel combustion and at the same time ensuring driving performance. Hybrid vehicles can be subdivided generally into a series hybrid method in which electric power is generated by driving a generator with a motor and an electric motor is driven with the generated electric power to obtain motive force to power the vehicle, and a parallel hybrid method in which a motor and an electric motor are respectively connected to a drive shaft to obtain vehicle motive force by the motor and electric motor. In both methods, the power output from the motor can be output to the drive shaft with arbitrary rotation speed and torque. Therefore, the motor can be driven selecting an operating point of high driving efficiency. As a result, the hybrid vehicle is superior to the conventional vehicle using only a motor as a driving source in the respects of resource-saving and exhaust purification.

Among these methods, in vehicles of the parallel hybrid method, for example, part of the power output from the engine which is a motor is transmitted to the drive shaft through a power adjusting apparatus. The remaining power is converted into electric power by the power adjusting apparatus. This electric power is accumulated in a battery, or used for driving the electric motor as a power source as an alternative to the engine.

As a power adjusting apparatus, for example, a mechanical distribution type power adjusting apparatus using a generator having a rotation shaft, planetary gear having three shafts connected respectively to the drive shaft, engine output shaft and generator rotation shaft, or an electric distribution type power adjusting apparatus using a twin-rotor electric motor comprising a rotor connected to the engine output shaft and a rotor connected to the drive shaft can be applied.

As is already known, the twin-rotor electric motor can transmit a mechanical power from one rotor to the other rotor and at the same time, extract the remaining power as electric power, by controlling the rotation speed difference between the two rotors, namely the sliding amount. In addition, mechanical power can be transmitted to the other rotor while increasing the mechanical power by supplying electric power. Moreover, as publicly known, the planetary gear is such that the rotation speed and torque of the remaining rotation shaft is determined when the rotation speed and torque of two of the three shafts is determined.

Based on these characteristics, for example, the remaining power can be extracted as electric power by a generator connected to the remaining rotation shaft, while outputting part of mechanical power input from the rotation shaft connected to the engine output shaft to the drive shaft. It is also possible to increase the power output from the engine and transmit it to the drive shaft by supplying this generator with electric power.

As mentioned above, for the hybrid vehicle, the engine which is a motor can be operated selecting an operating point of higher driving efficiency. So, in the related art of the invention, the engine operating point has been controlled to follow the maximum torque line of relatively high operating efficiency. Here, the maximum torque line is a curved line obtained by connecting points where the torque for each rotation speed is at its greatest in engine rotation speed-torque characteristics.

However, when the engine operating point is controlled to follow the maximum torque line, the following problems have been encountered.

Namely, for example, during driving, when the driver depresses the accelerator pedal in a demand for rapid acceleration, the required power to be output to the vehicle drive shaft increases, and consequently, the power required of the engine also suddenly increases. At this time, as the engine operating point has attained the maximum torque for the rotation speed at that moment by the aforementioned control, the torque can not be increased with the rotation speed of that time, and the power output from the engine does not become equal to the required power immediately. Further, while the engine operating point moves gradually along the maximum torque line according to the increase of the engine rotation speed, power is required for accelerating the inertia as the engine rotation speed increases so the engine operating point takes a considerable amount of time before arriving at the point where power equal to the required power is actually output from the engine, therefore deteriorating the response.

SUMMARY OF THE INVENTION

Therefore, it is an object of the invention to provide a power output apparatus that can solve the aforementioned problems of the related art and output the required power from a motor immediately, even when the power required of the motor increases suddenly.

In order to achieve at least part of the foregoing object, the power output apparatus of the invention comprises:

a motor for outputting power;

a generator for generating electric power using at least part of the power output by the motor;

an electric motor operated such that the power output to a drive shaft becomes a desired power using the generated electric power or the electric power accumulated after the generation of electric power; and a controller for obtaining the power required of the motor based on a predetermined parameter, and controlling an operating point of the motor based on the required power, wherein the controller sets beforehand a predetermined operation line lower in torque than the maximum torque line obtained by plotting the maximum torque for each rotation speed in the relation between the motor rotation speed and torque as a reference operation line for controlling the motor operating point, and controls so as to move the motor operating point along the reference operation line based on the demanded required power in a steady state; and controls the motor operating point such that the power output from the motor becomes the required power by increasing the motor torque while substantially maintaining the motor rotation speed irrespective of the reference operation line when the obtained required power increases.

Thus, in the power output apparatus of the invention, an operation line lower in torque than the maximum torque line is adopted as a reference operation line for moving the motor operating point along the reference operation line in a steady state and for controlling the motor operating point so that the power output from the motor be the required power by increasing the motor torque while substantially maintaining the motor rotation speed irrespective of the reference operation line when the power required of the motor increases.

Therefore, according to the power output apparatus of the invention, even when the power required of the motor increases suddenly, the motor torque increases without increasing the motor rotation speed and the power output from the motor becomes equal to the required power immediately, thereby reducing the time for the motor operating point to arrive at the point where the required power is actually output from the motor such that there is excellent response.

Also, in the power output apparatus of the invention, it is desirable that the controller controls to return the motor operating point to the reference operation line while substantially maintaining the power output from the motor after having controlled the motor operating point such that the power output from the motor becomes equal to the required power by increasing the motor torque while substantially maintaining the motor rotation speed.

By controlling in this way, it is possible to return to the operating point control along the reference operation line in a steady state, smoothly, while satisfying the required power.

Further, in the power output apparatus of the invention, when the motor comprises an engine, it is preferable that the controller increases the motor torque by adjusting the position of a throttle valve of the engine or the opening/closing timing of an intake valve.

Thus, the motor (engine) torque can be increased rapidly to a desired torque by adjusting the position of the throttle valve or the opening/closing timing of the intake valve.

The hybrid vehicle of the invention is a hybrid vehicle equipped with the aforementioned power output apparatus, wherein the wheels are driven by the power output to the drive shaft.

The hybrid vehicle of the invention is able to respond immediately to the demands of the driver. For example, during driving, even when the driver depresses the accelerator pedal in a demand for rapid acceleration, power equal to the required power can be extracted from the motor immediately.

The motor operating point control method of the invention is a method for controlling the motor operating point in a power output apparatus comprising a motor for outputting power, a generator for generating electric power using at least part of the power output by the motor, and an electric motor operated such that the power output to a drive shaft becomes a desired power using the generated electric power or the electric power accumulated after the generation of electric power, comprising steps of:

setting a predetermined operation line lower in torque than the maximum torque line obtained by plotting the maximum torque for each rotation speed in the relation between the motor rotation speed and torque as a reference operation line for controlling the motor operating point;

obtaining the power required of the motor based on a predetermined parameter;

controlling the motor operating point to move along the reference operation line based on the obtained required power; and controlling the motor operating point such that the power output from the motor becomes equal to the required power by increasing the motor torque while substantially maintaining the motor rotation speed irrespective of the reference operation line when the required power increases.

Therefore, according to the motor operating point control method of the invention, similar to the case of the aforementioned power output apparatus of the invention, even when the power required of the motor increases suddenly, the motor torque increases without increasing the motor rotation speed and the power output from the motor becomes equal to the required power immediately, thereby reducing the time for the motor operating point to arrive at the point where the required power is actually output from the motor such that there is excellent response.

DETAILED DESCRIPTION OF THE PREFERRED EMBODIMENTS

Figure 1:
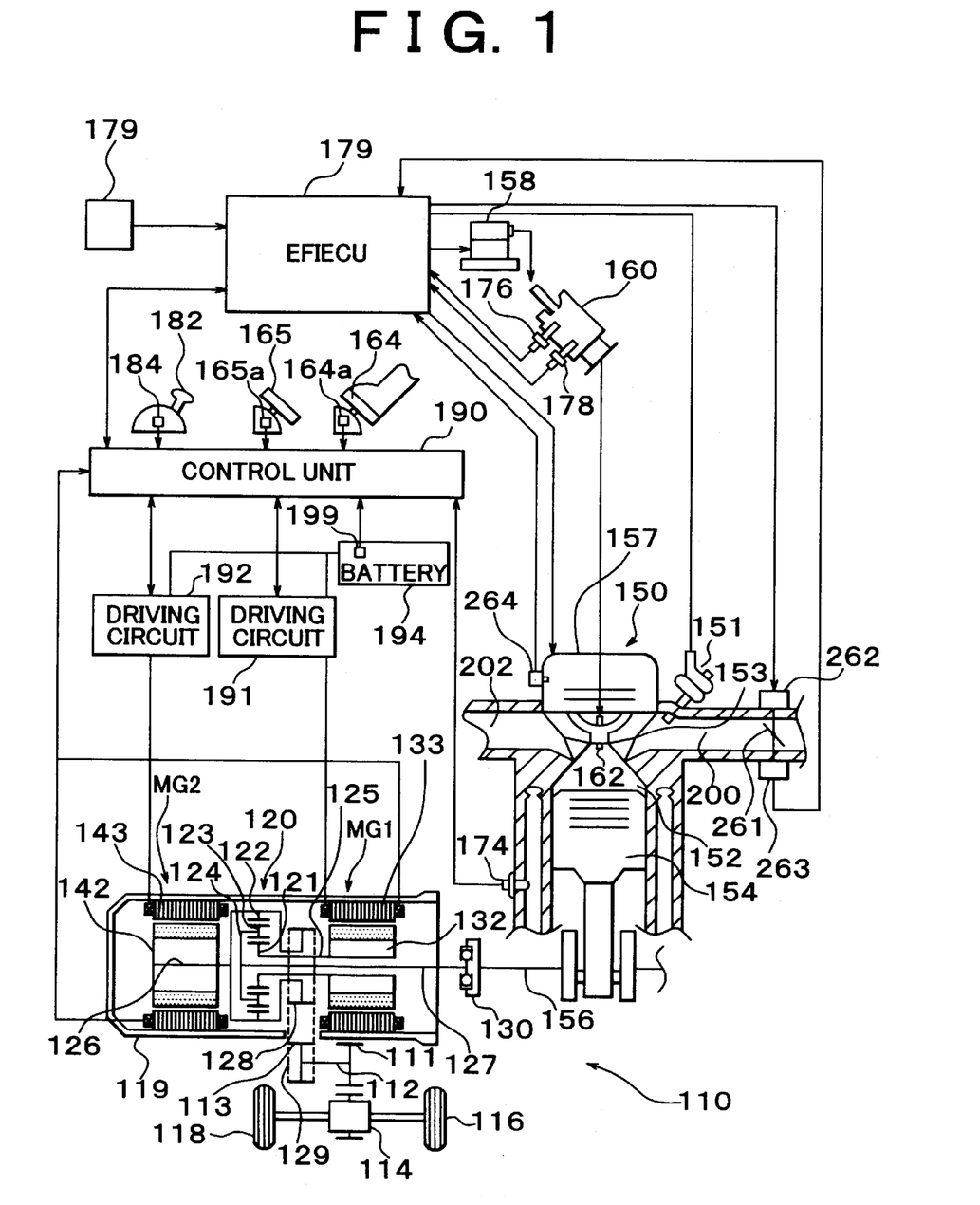
FIG. 1 is a block diagram of a hybrid vehicle equipped with a power output apparatus as an embodiment of the invention.

First, the configuration of an embodiment of the invention will be described using FIG. 1. FIG. 1 is a block diagram schematically showing a hybrid vehicle equipped with a power output apparatus as an embodiment of the invention.

This hybrid vehicle mainly comprises a power system for generating driving power, a control system thereof, a power transmission system for transmitting driving power from the driving source to driving wheels 116 and 118 and a driving operation section and the like.

The power system comprises a system including an engine 150 and a system including motors MG1 and MG2, while the control system comprises an electronic control unit (hereinafter referred to as EFIECU) 170 for controlling mainly the operation of the engine 150, a control unit 190 controlling mainly the operation of the motors MG1 and MG2, and various sensor sections for detecting, inputting and outputting signals necessary to the EFIECU 170 and the control unit 190.

Though the inner configuration of the EFIECU 170 and the control unit 190 is not shown concretely, they are respectively one-chip microcomputers including a CPU, ROM, and RAM or the like inside, and composed so as to perform the various control processing described below by the CPU according to the program recorded in the ROM.

The power is received from the engine 150 under the control of the EFIECU 170 and the control unit 190, and further, for the power of this engine 150, the power adjusted by the power or generation of electric power by the motors MG1 and MG2 is output to a drive shaft 112 by means of a planetary gear 120. This configuration shall be referred to as a power output apparatus 110, hereinafter.

The engine 150 in the power output apparatus 110 intakes air from an inlet 200 through a throttle valve 261, injects gasoline from a fuel injection valve 151, and generates a mixture with intake air and injected gasoline. At this time, the throttle valve 261 is opened/closed by an actuator 262. The engine 150 intakes the generated mixture into a combustion chamber 152 through an intake valve 153, and converts the motion of a piston 154 pushed down by the explosion of this mixture into a rotating motion of a crank shaft 156. This explosion is provoked by igniting and burning the mixture by an electric spark formed by an ignition plug 162 with a high voltage supplied via a distributor 160 from an igniter 158. Exhaust generated by the combustion is discharged into the atmosphere through an exhaust outlet 202.

The engine 150 is also provided with a mechanism for changing the opening/closing timing of the intake valve 153, a so-called continuous variable valve timing mechanism (hereinafter referred to as VVT) 157. This WT 157 adjusts the opening/closing timing of the intake valve 153 by advancing or delaying the phase with respect to the crank angle of an intake cam shaft (not shown) driving the opening/closing of the intake valve 153.

On the other hand, the engine 150 operation is controlled by the EFIECU 170. For instance, the throttle valve 261 is feedback controlled to a desired opening using an actuator 262 by the EFIECU 170 based on a detection signal obtained by a throttle valve position sensor 263 for detecting the opening (position) thereof. The aforementioned intake cam shaft phase advancing or delaying by the VVT 157 is also feedback controlled by the EFIECU 170 for obtaining a target phase based on a detection signal obtained by a cam shaft position sensor 264 for detecting the position of the intake cam shaft. In addition, there is ignition timing control of the spark plug 162 according to the rotational speed of the engine 150 and fuel injection amount control according to the intake air amount.

In order to allow the engine 150 to realize these controls, in addition to the throttle valve position sensor 263 and cam shaft position sensor 264 mentioned above, various sensors indicating the engine 150 operating state are connected to the EFIECU 170. For example, a rotation speed sensor 176 and a rotation angle sensor 178 disposed on a distributor 160 for detecting the rotation speed and rotation angle of the crank shaft 156, and a starter switch 179 for detecting the state of the ignition key are connected. The illustration of other sensors and switches and the like is omitted.

Next, the schematic configuration of motors MG1 and MG2 shown in FIG. 1 will be described. The motor MG1, composed as a synchronized generator, comprises a rotor 132 having a plurality of permanent magnets on the outer circumference, and a stator 133 where a three-phase coil forming a rotational magnetic field is wound. The stator 133, formed by layered thin plates of non-oriented electromagnetic steel, is affixed to a case 119. This motor MG1 operates as a motor for rotating the rotor 132 by the interaction between a magnetic field produced by the permanent magnets provided on the rotor 132 and a magnetic field formed by the three-phase coil provided on the stator 133. Depending on the case, the motor MG1 also operates as a generator, generating an electromotive force at both ends of the three-phase coil provided on the stator 133 by the interaction thereof.

Similar to the motor MG1, the motor MG2, also composed as a synchronized generator, comprises a rotor 142 having a plurality of permanent magnets on the outer circumference, and a stator 143 where a three-phase coil forming a rotational magnetic field is wound. The stator 143 of the motor MG2, also formed by layered thin plates of non-oriented electromagnetic steel, is affixed to the case 119. Just like the motor MG1, this motor MG2 also operates as a motor or as a generator.

These motors MG1 and MG2 are electrically connected to a battery 194 and the control unit 190 via first and second driving circuits 191 and 192 incorporated with six transistors (not shown), respectively, for switching. The control unit 190 outputs a control signal for driving the transistors in the first and second driving circuits 191 and 192. Six transistors in each of the driving circuits 191 and 192 compose a transistor inverter by being disposed in pairs of two so as to constitute a source side and a sink side. When the control unit 190 sequentially controls by a control signal the ON time proportion of the source side and the sink side of the transistor such that current flowing in each phase of the three-phase coil is a pseudo-sinusoidal wave by PWM control, a rotational magnetic field is formed by the three-phase coil and these motors MG1 and MG2 are driven.

In addition, various sensors and switches are electrically connected to the control unit 190 in order to control the hybrid vehicle driving state, including the control of the motors MG1 and MG2. Sensors and switched connected to the control unit 190 include an accelerator pedal position sensor 164a, brake pedal position sensor 165a, shift position sensor 184, water temperature sensor 174, and remaining capacity detector 199 of the battery 194 and the like.

The control unit 190 inputs various signals from the driving operation section and the battery 194 remaining capacity or others through these sensors, and exchanges through communication various information with the EFIECU 170 controlling the engine 150.

To be more specific, various signals from the driving operation section include a accelerator pedal position (accelerator pedal 164 depression amount) from the accelerator pedal position sensor 164a, brake pedal position (brake pedal 165 depression amount) from the brake pedal position sensor 165a, shift position (shift lever 182 position) from the shift position sensor 184, and the like. Besides, the remaining capacity of the battery 194 is detected by the remaining capacity detector 199.

The power transmission system for transmitting driving power from the driving source to the driving wheels 116 and 118 are composed as follows. A crank shaft 156 for transmitting power from the engine 150 is connected to a planetary carrier shaft 127 through a damper 130, and this planetary carrier shaft 127, a sun gear shaft 125 for transmitting the rotation of the motors MG1 and MG2, and a ring gear shaft 126 are mechanically connected to a planetary gear 120 to be mentioned later. The damper 130 is provided for the purpose of connecting the crank shaft 156 of this engine 150 and the planetary carrier shaft 127 and to control the amplitude of crank shaft 156 torsion vibration.

With the ring gear 122, a power take-off gear 128 for power take-off is connected at a position between the ring gear 122 and the motor MG1. This power take-off gear 128 is connected to a power receiving gear 113 through a chain belt 129, and power is transmitted between the power take-off gear 128 and the power receiving gear 113. This power receiving gear 113 is connected to a power transmission gear 111 through the drive shaft 112, and this power transmission gear 111 is further coupled to right and left driving wheels 116 and 118 through a differential gear 114 such that power can be transmitted to them.

Here, in addition to the configuration of the planetary gear 120, the junction of the crank shaft 156, planetary carrier shaft 127, sun gear shaft 125 which is the rotation shaft of the motor MG1, a ring gear shaft 126 which is the rotation shaft of the motor MG2 will be described. The planetary gear 120 is composed of three elements: a sun gear 121, two concentric gears composing the ring gear 122, and a plurality of planetary pinion gears 123 disposed between the sun gear 121 and the ring gear 122, rotating on their own axes while rotating around the periphery of the sun gear 121. The sun gear 121 is connected to the rotor 142 of the motor MG1 through a hollow sun gear shaft 125 through which the planetary carrier shaft 127 passes at the axial center, while the ring gear 122 is connected to a rotor 142 of the motor MG2 through the ring gear shaft 126. The planetary pinion gears 123 are connected to the planetary carrier shaft 127 through a planetary carrier 124 journaling the rotation shaft thereof, and the planetary carrier shaft 127 is connected to the crank shaft 156. As is well known in mechanics, the planetary gear 120 is such that, among the three shafts including the aforementioned sun gear shaft 125, ring gear shaft 126 and planetary carrier shaft 127, when the rotation speed of any two of them and the torque input/output to these shafts are determined, the rotation speed of the remaining one shaft and the torque input/output to the same are also determined.

Now, the general operation of a hybrid vehicle shown in FIG. 1 will be described briefly. During running, a hybrid vehicle having the aforementioned configuration outputs power corresponding to the required power to be output to the drive shaft 112 from the engine 150, and torque converts the output power and transmits it to the drive shaft 112 as described below. When the crank shaft 156 of the engine 150 rotates at a high speed and with low torque with respect to the required rotation speed and required torque to be output from the drive shaft 112, the torque conversion recovers part of the power output by the engine 150 as electric power by the motor MG1, and drives the motor MG2 with that electric power.

To be more specific, first, the power output from the engine 150 is divided by the planetary gear 120 into power to be transmitted to the motor MG1 connected to the sun gear shaft 125 and power to be transmitted to the drive shaft 112 through the ring gear shaft 126. This power distribution is performed under a condition where the ring gear shaft 126 rotation speed corresponds to the require rotation speed. The power transmitted to the sun gear 125 is regenerated as electric power by the motor MG1. On the other hand, torque is added to the ring gear shaft 126 by driving the motor MG2 connected to the ring gear shaft 126 using this electric power. This torque is added such that the required torque is output to the drive shaft 112. In this way, the power output from the engine 150 can be output at a desired rotation speed and torque from the drive shaft 112 by adjusting power exchanged through the motors MG1 and MG2 in the form of electric power.

Conversely, when the crank shaft 156 of the engine 150 rotates at a low speed and with high torque with respect to the required rotation speed and required torque to be output from the drive shaft 112, part of the power output by the engine 150 is recovered as electric power by the motor MG2, and the motor MG1 is driven with that electric power.

Here, it is possible to accumulate part of the electric power regenerated by the motor MG1 or MG2 in the battery 194. It is also possible to drive the motor MG1 or MG2 using the electric power accumulated in the battery 194.

Based on the aforementioned operation principle, during normal running, for example, running: is performed using the engine 150 as the main driving source and the power of the motor MG2 at the same time. Thus, running is done by both of engine 150 and motor MG2 as the driving source, allowing the engine 150 to operate at an operating point of high operating efficiency according to the required torque and the torque that can be generated by the motor MG2. Therefore, the resource-saving and exhaust cleaning characteristics are superior compared to a vehicle using only the engine 150 as the driving source. Meanwhile, as the rotation of the crank shaft 156 can be transmitted to the motor MG1 through the planetary carrier shaft 127 and the sun gear shaft 125, it is also possible to run while generating electric power by the motor MG1 through the operation of the engine 150.

The following relation is known in the rotation speed of the planetary gear 120 used for the aforementioned torque conversion. That is, for the planetary gear 120, if the gear ratio of sun gear 121 and ring gear 122 (number of teeth of the sun gear/number of teeth of the ring gear) is ρ, in general, the following expression (1) is established between the sun gear shaft 125 rotation speed Ns, the planetary carrier shaft 127 rotation speed Nc, and ring gear 126 rotation speed Nr. In the case of this embodiment, the sun gear shaft 125 rotation speed Ns is a parameter equivalent to a motor MG1 rotation speed ng, the ring gear 126 rotation speed Nr is a parameter equivalent to the vehicle speed and the motor MG2 rotation speed nm, and the planetary carrier shaft 127 rotation speed Nc is a parameter equivalent to the engine 150 rotation speed ne.

$$Ns=Nc+(Nc-Nr)/\rho \quad (1)$$

Figure 2:
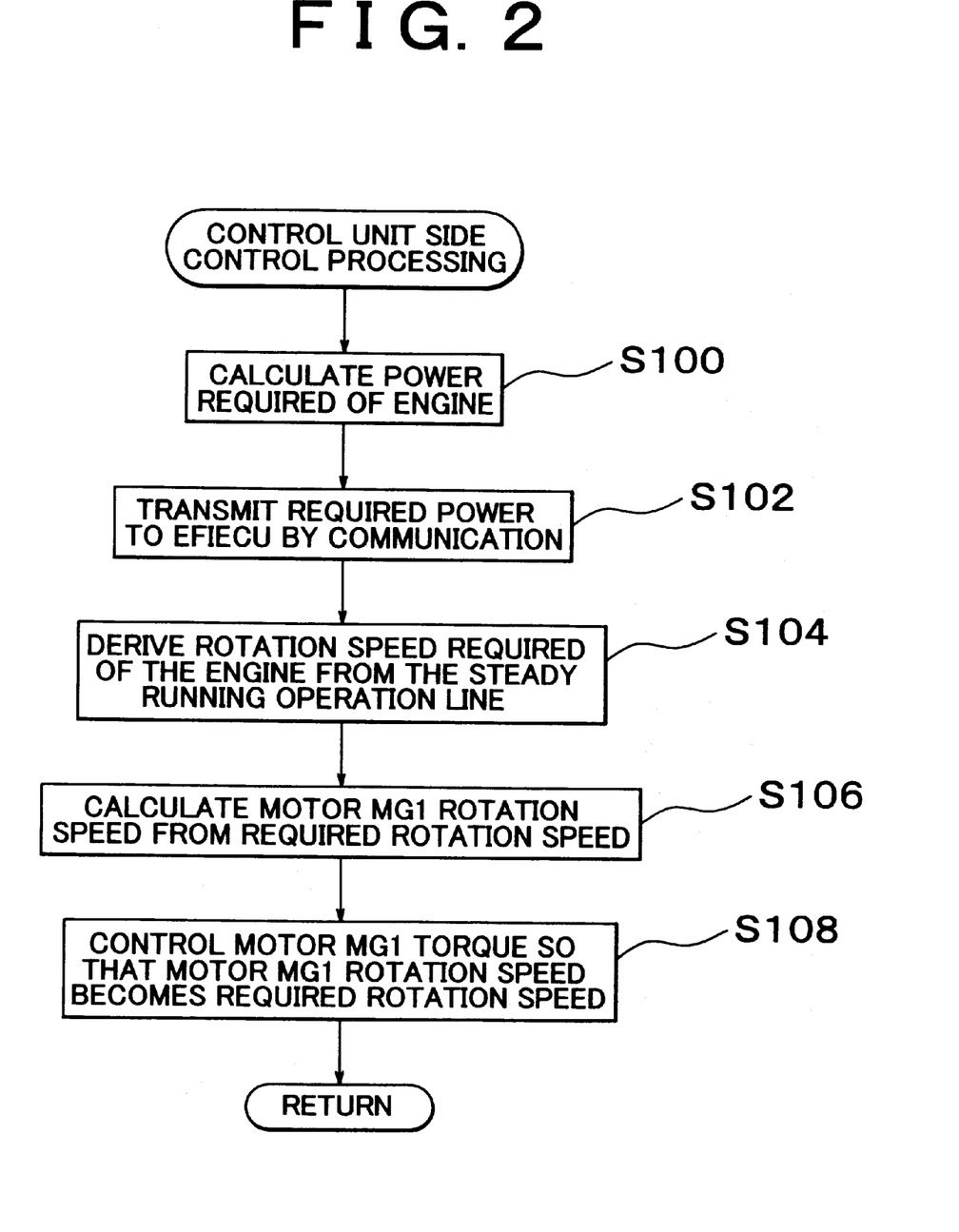
FIG. 2 is a flow chart showing the flow of the control processing routine by a control unit 190, among operating point control processing of an engine 150.

Next, the engine 150 operating point control processing in this embodiment shall be described. FIG. 2 is a flow chart showing the flow of the control processing routine by the control unit 190, among the operating point control processing of the engine 150. This routine is a processing performed by a CPU (not shown) of the control unit 190.

When the control processing routine shown in FIG. 2 starts, first, the control unit 190 performs processing for calculating a power spv required of the engine 150 (step S100). This required power spv is calculated by the following expression (2):

$$spv=spacc+spchg+spAC \quad (2)$$

Here, respective terms of the right side of the expression (2) are as follows.

spacc: power in a case where the driving torque for vehicle running is totally supplied by the engine 150 output (value converted into electric generation amount); determined from a map having the accelerator pedal 164 press amount and the vehicle speed as parameters. Here, as mentioned above, the control unit 190 obtains the accelerator pedal 164 depression amount from the accelerator pedal position sensor 164a, and the vehicle speed from a sensor (not shown) for detecting the ring gear 126 rotation speed Nr.

spchg: battery 194 discharge/charge required power; determined from the remaining capacity of the battery 194. In general, when the remaining capacity is low, the charge demand is high, the discharge/charge requirement is 0 at a remaining capacity of about 60 [%], and at 60 or greater, discharge is required.

spAC: compensation amount when driving an air conditioner (not shown). As the air-conditioner consumes a large amount of electric power, its power consumption is compensated separate from other accessories.

When the power spv required of the engine 150 is calculated, the control unit 190 transmits this calculation result to the EFIECU 170 by communication (step S102). Next, the control unit 190 obtains a rotation speed ne* required of the engine 150 from a predetermined steady running operation line using the calculated required power spv (step S104).

Figure 3:
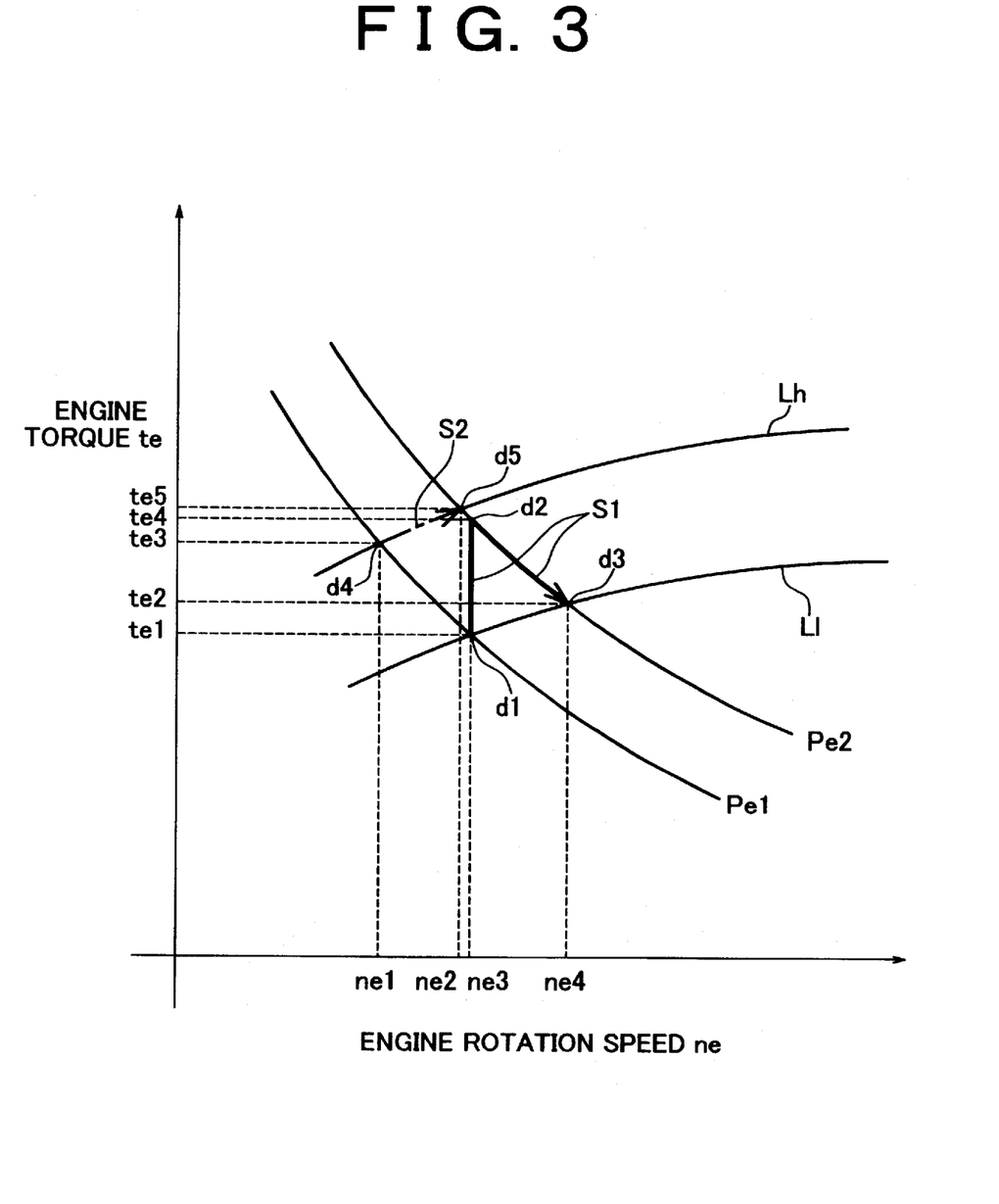
FIG. 3 is a characteristics diagram showing by comparison of the operation line during steady running used in the embodiment of FIG. 1 and the engine maximum line used in the related art.

FIG. 3 is a characteristics diagram showing a comparison of the steady running operation line used for this embodiment and the engine maximum line used in the related art. In FIG. 3, the vertical axis represents an engine 150 torque te and the horizontal axis represents the engine 150 rotation speed ne, respectively. Moreover, the curb Lh is the engine 150 maximum torque line, and the curb L1 is the steady running operation line used in this embodiment. Here, the maximum torque line Lh is a curb obtained by plotting the maximum torque temax for each rotation speed in the relation of the engine 150 rotation speed and torque te.

Figure 4:
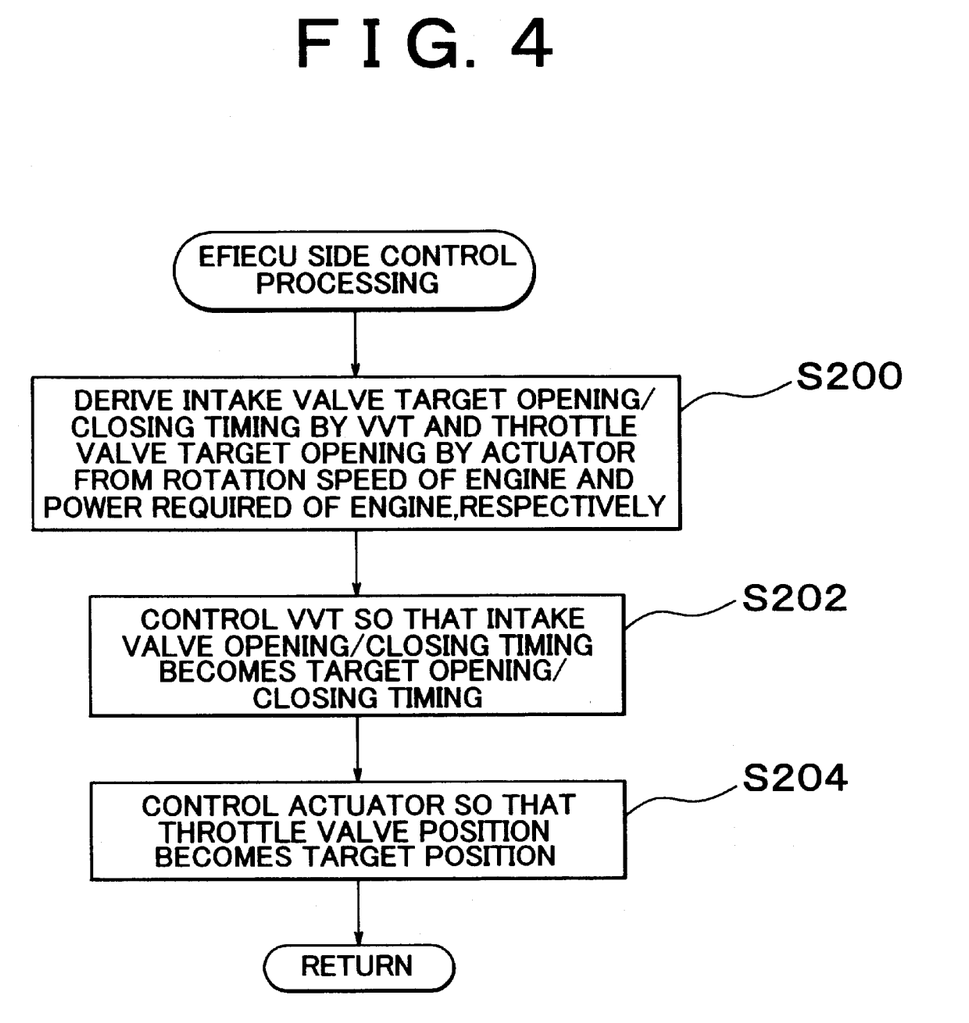
FIG. 4 is a flow chart showing the flow of the control processing routine by an EFIECU 170, among operating point control processing of the engine 150.

In the related art, as mentioned above, the maximum torque line Lh was used as the engine 150 steady running operation line; however, in this embodiment, as shown in FIG. 4, a desired line L1 lower in torque te than the maximum torque line Lh shall be used as the engine 150 operation line.

Meanwhile, as the power Pe output from the engine 150 can be represented, as it is well known, as the product (nexte) of the engine 150 rotation speed ne and torque te, when the so-called equivalent output line, wherein the power Pe from the engine 150 becomes constant, is plotted in FIG. 3, for example, Pe1, Pe2 can be obtained.

Consequently, for example, if the power spv required of the engine 150 calculated in the step S100 is Pe1 and an intersection d1 of this equivalent output line Pe1 and the steady running operation line L1 is obtained in FIG. 3, the rotation speed ne 3 at this point d1 becomes the rotation speed ne* required of the engine 150 to be obtained.

In practice, the engine 150 rotation speed ne for each power Pe from the engine 150 is obtained beforehand based on the steady running operation line L1 and stored as a map in ROM (not shown) in the control unit 190, and the rotation speed ne* required of the engine 150 is obtained from this map with respect to the resultant power spv required of the engine 150.

Next, the control unit 190 calculates the required rotation speed ng* of the motor MG1 from the rotation speed ne* required of the engine 150 obtained previously(step S106). As mentioned above, in the relational expression (1) of the planetary gear 120, the sun gear shaft 125 rotation speed Ns is a parameter equivalent to the motor MG1 rotation speed ng, the ring gear 126 rotation speed Nr is a parameter equivalent to the vehicle speed, and the planetary carrier shaft 127 rotation speed Nc is a parameter equivalent to the engine 150 rotation speed ne. Moreover, as the vehicle speed is already obtained in step S100, the required rotation speed ng* of the motor MG1 can be obtained easily from the rotation speed ne* required of the engine 150, using expression (1).

Next, the control unit 190 obtains the actual rotation speed ng of the motor MG1 from a sensor (not shown) for detecting the rotation speed Ns of the sun gear shaft 125, and controls the motor MG1 torque tg so that this rotation speed ng agrees with the required rotation speed ng* obtained previously (step S108). Concretely, this control is performed by a so-called proportional integration control (PI control). In short, torque tg* required of the motor MG1 is obtained from the sum of a proportional obtained by multiplying the difference of the required rotation speed ng* and the actual rotation speeding of the motor MG1 by a predetermined proportionality factor, and an integrational obtained by multiplying the time integration value of the difference by a predetermined proportionality factor to control such that the motor MG1 torque tg corresponds to the required torque tg*.

By thus controlling the motor MG1 torque tg so that the motor MG1 rotation speed ng agrees with the rotation speed ng* required of the motor MG1, the actual rotation speed ne of the engine 150 also becomes equal to the rotation speed ne* required of the engine 150. This is because, as the vehicle speed can be presumed to be constant during steady running, from the expression (1), when the motor MG1 rotation speed ng becomes the rotation speed ng* required of the motor MG1, necessarily, the rotation speed ne of the engine 150 becomes the rotation speed ne* required of the engine 150.

Consequently, by performing the aforementioned control processing routine, the engine 150 operating points moves along the steady running operation line L1 shown in FIG. 3.

FIG. 4 is a flow chart showing the flow of the control processing routine by the EFIECU 170, among operating point control processing of the engine 150. This routine is processing executed by a PCU (not shown) of the EFIECU 170.

When the control processing routine shown in FIG. 2 starts, first, the EFIECU 170 obtains the actual rotation speed ne of the engine 150 from a sensor (not shown) for detecting the rotation speed of the crank shaft 156. This may be obtained directly from a rotation speed sensor 176 provided on the distributor 160. Then the EFIECU 170 obtains an intake valve 153 target opening/closing timing VT* by the VVT 157 and a throttle valve 261 target position SVP* by the actuator 262, respectively, from the obtained rotation speed ne of the engine 150 and the power spv required of the engine 150 transmitted from the control unit 190 through communication (step S200).

In general, in the VVT 157, if the intake cam shaft phase is controlled to advance as the opening/closing timing of the intake valve 153, the compression stroke of the mixture taken in the combustion chamber 152 becomes that much longer, and the torque te output from the engine 150 increases. As for the throttle valve 261, when the position SVP of the throttle valve 261 is increased by the actuator 262, the torque te output from the engine 150 increases.

Therefore, the torque te output from the engine 150 can be changed directly by respectively changing the opening/closing timing VT of the intake valve 153 by the VVT 157, and the position SVP of the throttle valve 261 by the actuator 262. Here, the torque te variation range based on the opening/closing timing VT of the intake valve 153 is relatively narrower than the torque te variation range based on the position SVP of the throttle valve 261.

There, the intake valve 153 target opening/closing timing VT* and the throttle valve 261 target position SVP* can be obtained from the actual rotation speed ne of the engine 150 and the power spv required of the engine 150, respectively, as follows. Namely, the required torque te* of the engine 150 is obtained by dividing the power spv required of the engine 150 by the actual rotation speed ne. Then the opening/closing timing VT of the intake valve 153 necessary for actually outputting this required torque te* from the engine 150 is determined. When the torque output from the engine 150 is insufficient for the required torque te* by only changing the opening/closing timing VT of the intake valve 153, the position SVP of the throttle valve 261 necessary for outputting the lacking torque from the engine 150 is obtained. The thus obtained opening/closing timing VT of the intake valve 153 and opening/closing timing VT of the throttle valve 261 shall be the intake valve 153 target opening/closing timing VT* and the throttle valve 261 target position SVP*, respectively.

In practice, the intake valve 153 target opening/closing timing VT* and the throttle valve 261 target position SVP* are obtained beforehand for each rotation speed and power of the engine 150 and stored as a target opening/closing timing calculation map and target position calculation map in ROM (not shown) in the EFIECU 170, and the target opening/closing timing VT* and the target position SVP* shall be obtained respectively for the obtained rotation speed ne of the engine 150 and the power spv required of the engine 150.

Next, the EFIECU 170 controls the VVT 157 so that the intake valve 153 actual opening/closing timing VT becomes the intake valve 153 target opening/closing timing VT* based on the thus obtained intake valve 153 target opening/closing timing VT* (step S202). In addition, the EFIECU 170 controls the actuator so that, similarly, the throttle valve 261 actual position SVP becomes the throttle valve 261 target position SVP* based on the thus obtained throttle valve 261 target position SVP* (step S204). Here, when the torque output from the engine 150 meets the require torque te* by only changing the opening/closing timing VT of the intake valve 153 by the processing of the step S202, the processing of step S204 becomes control to maintain the position SVP of the throttle valve 261 as it is.

As the result, by performing the control processing routine as mentioned above, the torque te output from the engine 15 is adjusted such that power substantially equal to the required power spv is output from the engine 150.

Now, the type of movement of the operating point of engine 150 when the power spv required of the engine 150 is increased suddenly by performing the aforementioned operating point control processing of the engine 150 as shown in FIG. 2 and FIG. 4 will be described using FIG. 3 while comparing it with the case of the related art.

Now, during steady running, if the power actually output from the engine 150 is the value Pe, the operating point of the engine 150 exists on the equivalent output line Pe1 in FIG. 3.

Thereafter, when the driver depresses the accelerator pedal in a demand for a rapid acceleration, since spacc increases as is evident from the expression (2), the power spv required of the engine 150 also increases, and if the required power spv is the value Pe, the operating point of the engine 150 should move from on the equivalent output line Pe1 to the equivalent output line Pe2 in FIG. 3.

As described above, in the related art, the maximum torque line Lh shown in FIG. 3 has been used as the engine 150 operation line during steady running. Consequently, before the driver presses the accelerator pedal 164, the steady running operation line is at the intersection d4 of the equivalent output line Pe1 and the maximum torque line Lh. At this intersection d4, the rotation speed ne of the engine 150 is ne1, and the engine 150 torque te is te3. Note that the product of the rotation speed ne1 and the torque te3 is equal to the power Pe1.

Thereafter, when the driver depresses the accelerator pedal 164 and the power spv required of the engine 150 increases, the operating point of the engine 150 moves from the intersection d4 to the intersection d5 of the equivalent output line Pe2 and the maximum torque line Lh along the maximum torque line Lh. At this intersection d5, the rotation speed ne of the engine 150 is ne2, and the engine 150 torque te is te5. Note that the product of the rotation speed ne2 and the torque te5 is equal to the power Pe2.

Consequently, in the related art, the operating point of the engine 150 moved as shown by the arrow S2 of the dotted chain line in FIG. 3.

When the power spv required of the engine 150 increases suddenly, since the operating point of the engine 150 is on the intersection d4 on the maximum torque line Lh, the torque te at this intersection d4 has already reached the maximum torque. Consequently, it is impossible to further increase the torque without increasing the engine 150 the rotation speed ne. To move the operating point of the engine 150 from the intersection d4 to the intersection d5 along the maximum torque line Lh, it is necessary to increase the engine 150 rotation speed ne from ne1 to ne2. However, it takes time to increase the rotation speed ne because of inertia; therefore, the engine operating point can not be readily moved to the intersection d5. Consequently, in the related art, it took time to increase the power Pe output from the engine 150 to the value Pe which is the required power spv so response was poor.

Conversely, in this embodiment, an operation line L1 lower in torque te than the maximum torque line Lh is used as the engine 150 operation line as shown in FIG. 3. Consequently, before the driver depresses the accelerator pedal 164, the operating point of the engine 150 is at the intersection d1 of the equivalent output line Pe1 and the maximum torque line L1. At this intersection d1, the rotation speed ne of the engine 150 is ne3, and the engine 150 torque te is te1. Note that the product of the rotation speed ne3 and the torque te1 is equal to the power Pe1.

Thereafter, when the driver depresses the accelerator pedal 164 and the power spv required of the engine 150 increases, this information is transmitted from the control unit 190 to the EFIECU 170, and based on this information, the opening/closing timing control of the intake valve 153 by the VVT 157, as well as the position control of the throttle valve 261 by the actuator 262 are performed by the control processing shown in FIG. 4. As the result, the torque te output from the engine 150 increases suddenly, and the power Pe output from the engine 150 becomes the value Pe2 which is the required power spv. In this embodiment, since the operation line L1 lower in torque te than the maximum torque line Lh is used as the engine 150 operation line, when the required power spv increases suddenly, the engine 150 torque te has enough room to attain the maximum torque at a rotation speed ne3 thereof. Consequently, is becomes possible to further increase the engine 150 torque te from te1.

At this time, the control processing by the control unit 190 shown by FIG. 2 is performed in parallel; however, the required rotation speed ne* of the engine 150 obtained in step S104 becomes the rotation speed ne4: at the intersection d3 of the equivalent output line Pe2 corresponding to the required power spv and the operation line L1. Therefore, the control processing shown by FIG. 2 is performed in such a way as to increase the engine 150 rotation speed ne from ne3 to ne4. However, since it takes time to increase the engine 150 rotation speed ne, before the engine 150 torque te increases by the control processing shown in FIG. 4 and the power Pe output from the engine 150 becomes the value Pe2 which is the required power spv, the engine 150 rotation speed ne scarcely increases.

Therefore, the operating point of the engine 150 moves from the intersection d1, while substantially maintaining the engine 150 rotation speed ne and increasing the torque te, to the intersection d2 of the equivalent output line Pe2 and a straight line parallel to the coordinate axis of the torque te. At this time, the operating point of the engine 150 moves from the intersection d1 to the intersection d2 rapidly because the engine 150 torque increases suddenly without increasing the engine 150 rotation speed ne. Note that the engine 150 rotation speed ne at the intersection d2 remains ne3, the engine 150 torque te is te4, and the product of the rotation speed ne3 and the torque te4 is equal to the power Pe2.

Thus, when the operating point of the engine 150 moves to the intersection d2, the engine 150 torque te does not increase any more by the control processing shown in FIG. 4. However, the engine 150 rotation speed ne increases gradually from ne3 to ne4 by the control processing shown in FIG. 2. Consequently, if the power spv required of the engine 150 remains constant, it is operated such that the torque te output from the engine 150 decreases to make the power Pe output from the engine 150 remain constant at the value Pe2, even if the engine 150 rotation speed ne increases by the control processing shown in FIG. 4.

As a result, the operating point of the engine 150 moves from the intersection d2 along the equivalent output line Pe2 while decreasing the engine 150 torque te and increasing the engine 150 rotation speed ne. Then, when the operating point of the engine 150 moves to the intersection d3 of the equivalent output line Pe2 and the operation line L1, since the engine 150 rotation speed ne matches the rotation speed ne4 which is the required rotation speed ne* obtained in step S102 in FIG. 2, the engine 150 rotation speed ne does not increase any more by the control processing shown in FIG. 2. Consequently, the operating point of the engine 150 remains at the intersection d3 so as to have returned to the original operation line L1. At this intersection d3, the rotation speed ne of the engine 150 is ne4 as mentioned above, the engine 150 torque te is te2, and the product of the rotation speed ne4 and the torque te2 is equal to the power Pe2.

As a result, in this embodiment, the operating point of the engine 150 moves as shown by a bold arrow S1 in FIG. 3.

Now, the variation of respective values concerning the engine 150 will be described using FIG. 5 while comparing the related art with this embodiment.

Figure 5A:
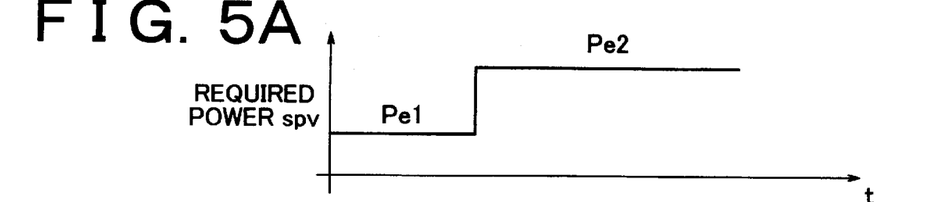
FIG. 5A to FIG. 5F are timing charts showing the variation of respective values related to the engine 150 in over the course of time comparing the related art and the invention.
Figure 5B:
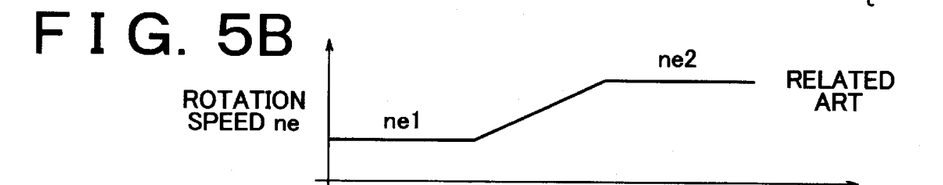
Figure 5C:
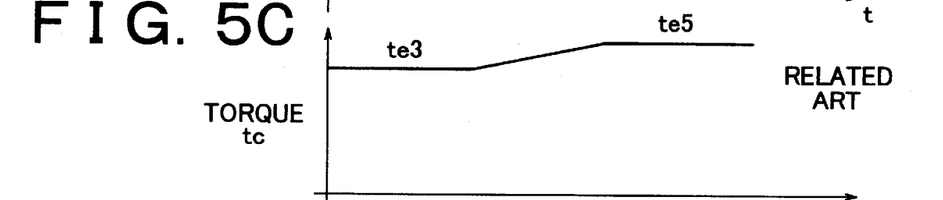
Figure 5D:
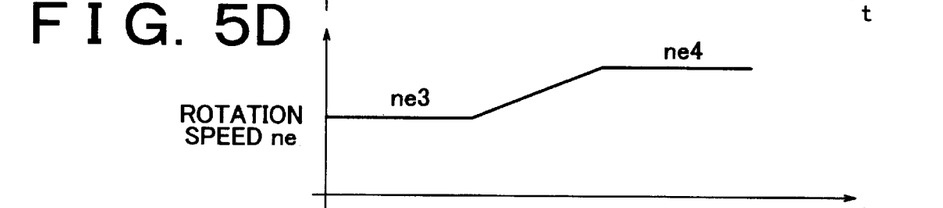
Figure 5E:
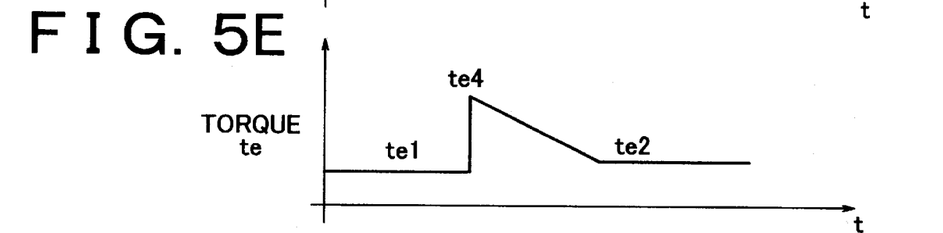
Figure 5F:
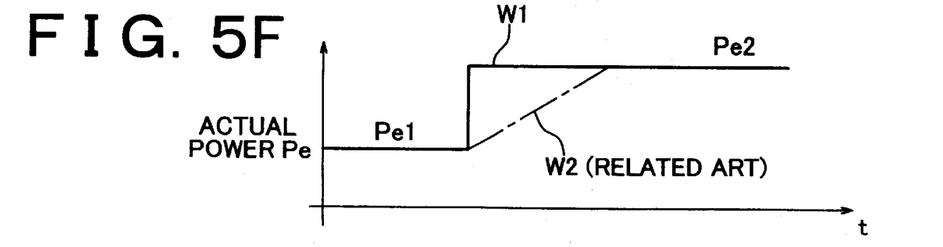

FIGS. 5A, 5B, 5C, 5D, 5E and 5F are timing charts showing the variation of respective values concerning the engine 150 over the course of time, comparing the related art and the invention. Specifically, FIG. 5A shows the variation over time of the power spv required of the engine 150; FIGS. 5B and 5C show the variation over time of the engine 150 rotation speed ne and torque te in the related art; FIGS. 5D and 5E show the variation over time of the engine 150 rotation speed ne and torque te, respectively, in this embodiment; and FIG. 5F shows the variation over time of the power Pe actually output from the engine 150, comparing this embodiment with the related art. In FIG. 5F, W1 denotes the case with this embodiment, while W2 denotes the case with the related art.

In the related art, even when the power spv required of the engine 150 increases suddenly from Pe1 to Pe2 as shown in FIG. 5A, the engine 150 rotation speed ne increases only gradually as shown in FIG. 5B, and consequently, the power Pe actually output from the engine 150 does not increase but slowly from Pe1 to Pe2 as shown by W2 in FIG. 5F so response is poor. In addition, since the operating point of the engine 150 moves along the maximum torque line Lh, the torque te output from the engine 150 has already attained the maximum torque at every point corresponding to the engine 150 rotation speed ne, and consequently a further increase in the torque te at the respective time points is not possible. As the result, the torque te is only able to increase slowly according to the increase in the rotation speed ne as shown in FIG. 5.

Conversely, in this embodiment, when the power spv required of the engine 150 increases suddenly from Pe1 to Pe2 as shown in FIG. 5A, the engine 150 torque te increases instantaneously at that time point as shown in FIG. 5E while maintaining the engine 150 rotation speed ne as shown in FIG. 5B. Therefore, the power Pe actually output from the engine 150 increases rapidly from Pe1 to Pe2 at this time point as shown by W1 in FIG. 5F such that there is extremely superb response. Thereafter, the power Pe output from the engine 150 is maintained constant at the value Pe2 by decreasing the torque te along with the increase of the engine 150 rotation speed ne.

As described above, in this embodiment, since an operation line L1 lower in torque te than the maximum torque line Lh is used as the steady running operation line, the engine torque te can be increased when the power spv required of the engine 150 increases suddenly. In addition, since the engine 150 torque te can be increased directly and instantaneously by the opening/closing timing control of the intake valve 153 by the VVT 157 and the position control of the throttle valve 261 by the actuator 262, power equivalent to the required power spv can be output immediately from the engine 150 without substantially increasing the engine 150 rotation speed ne such that there is extremely superb response.

Figure 6:
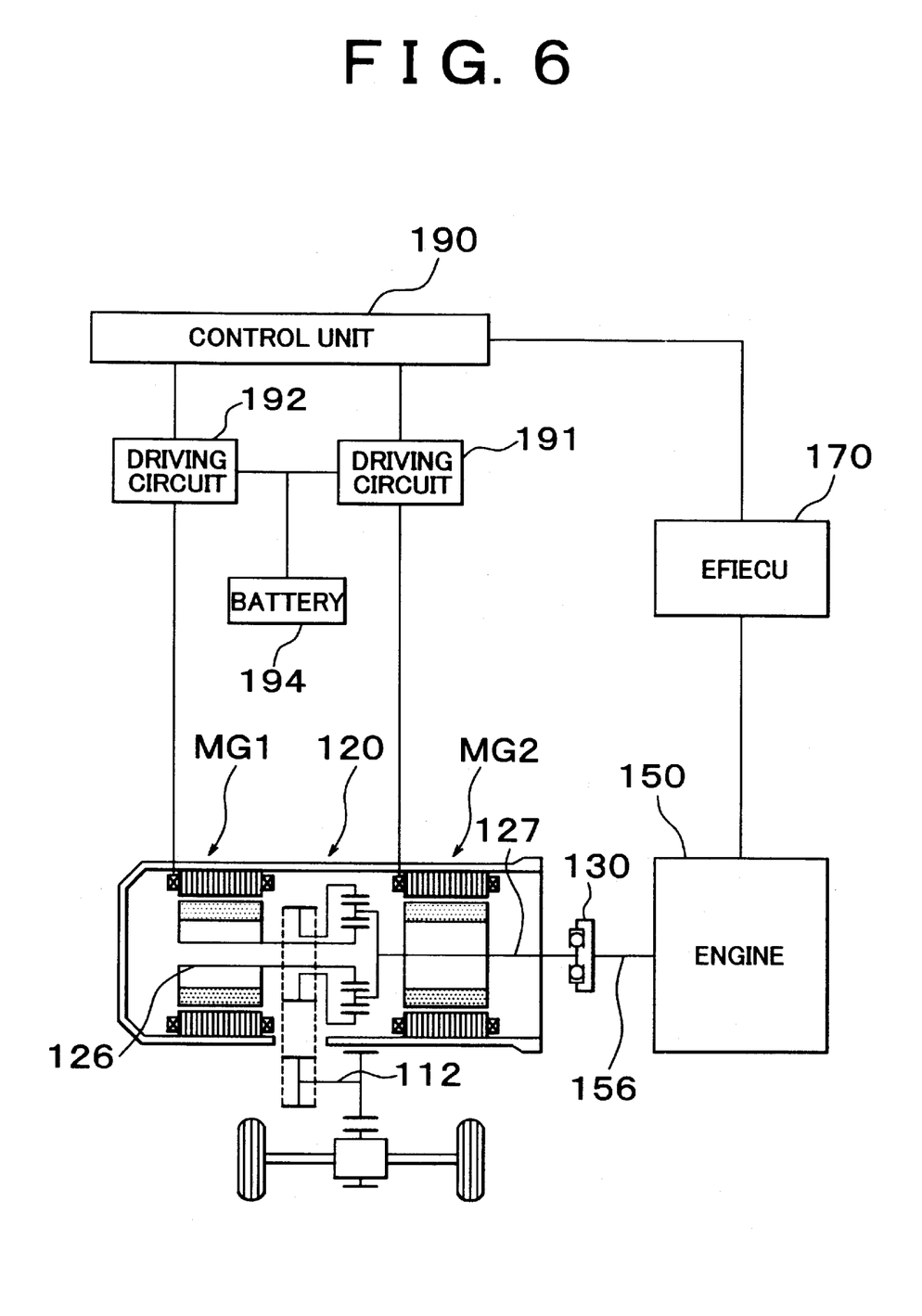
FIG. 6 is a block diagram of a hybrid vehicle equipped with a power output apparatus as a second embodiment of the invention.

In addition to the configuration shown in FIG. 1, various other configurations are possible for a power output apparatus to which the invention is applied. Though in FIG. 1 the motor MG2 is connected to the ring gear 126, a configuration wherein the motor MG2 is connected to the planetary carrier shaft 127 directly coupled with the crank shaft 156 of the engine 150 can be adopted. FIG. 6 shows a configuration as a second embodiment of the invention. In FIG. 6, the coupling state of engine 150 and motors MG1 and MG2 to the planetary gear 120 is different from that in the first embodiment. The motor MG1 is connected to the sun gear shaft 125 related to the planetary gear 120, and the crank shaft 156 of the engine 150 is connected to the planetary carrier shaft 127 similarly as in FIG. 1. FIG. 6 is different from the embodiment of FIG. 1 in that the motor MG2 is connected to the planetary carrier shaft 127, and not to the ring gear shaft 126.

Also, in such a configuration, additional torque can be applied to the planetary carrier shaft 127 connected directly to the crank shaft 156 by driving the motor MG2 connected to the planetary carrier shaft 127, for example, using electric power regenerated by the motor MG1. This torque is added so that the required torque will be output to the drive shaft 112. Consequently, similarly to the embodiment of FIG. 1, the power output from the engine 150 can be output at a desired rotation speed and torque from the drive shaft 112 by adjusting power exchanged through the motors MG1 and MG2 in the form of electric power; therefore, the engine 150 can be operated freely selecting its operating point. Consequently, the invention can also be applied to such a configuration.

Figure 7:
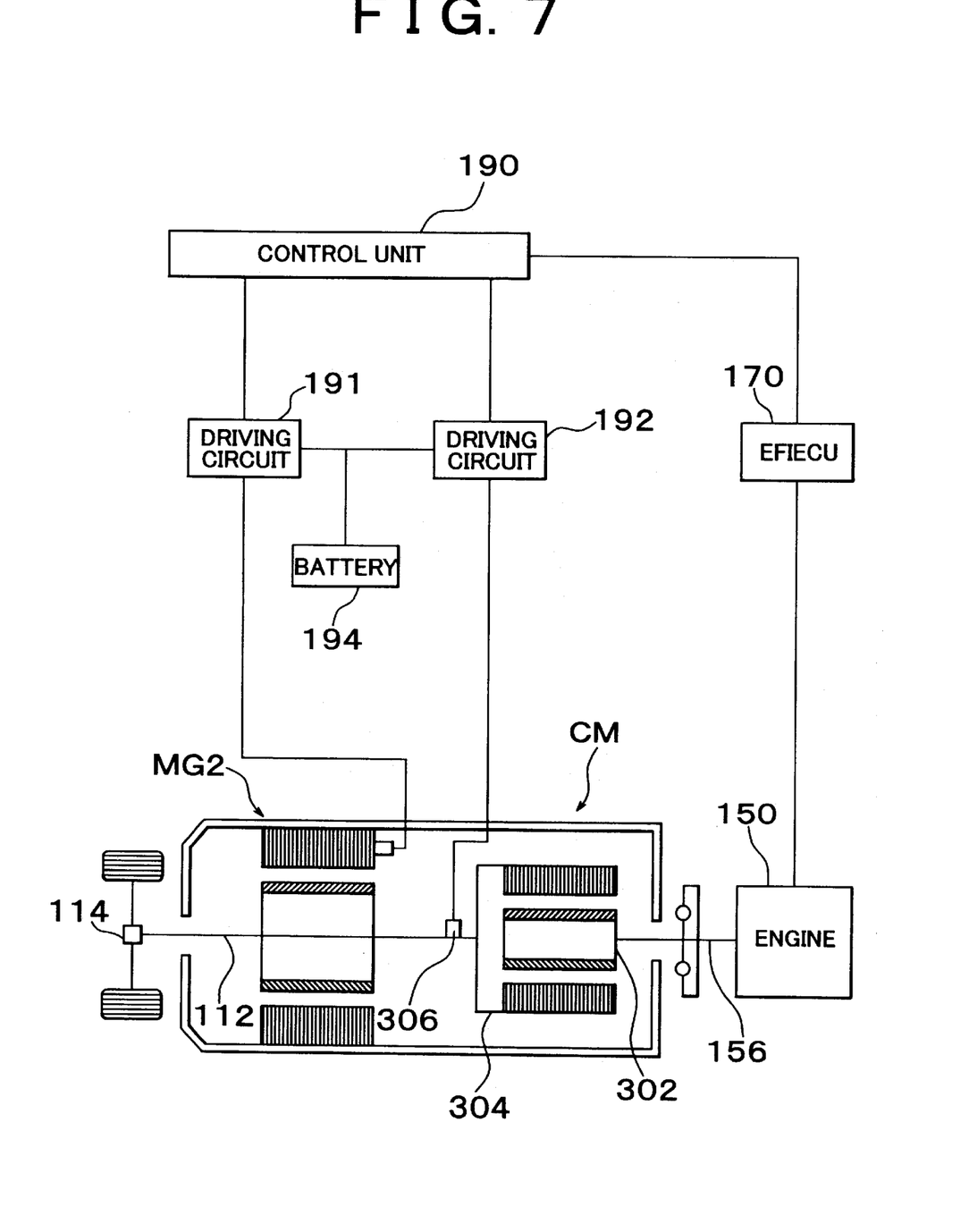
FIG. 7 is a block diagram of a hybrid vehicle equipped with a power output apparatus as a third embodiment of the invention.

The invention can also be applied to a power output apparatus of another configuration. A configuration as a third embodiment is shown in FIG. 7. In the aforementioned embodiment and the second embodiment, a mechanical distribution type power adjusting device using planetary gear 120 or the like was used as a power adjusting device for transmitting part of the power output from the engine 150 to th e drive shaft 112; in this third embodiment, an electric distribution type power adjusting device using a twin-rotor electric motor or the like is used as the power adjusting device. To be more specific, a clutch motor CM is used in place of the planetary gear 120 and the motor MG1 in this power output apparatus. A clutch motor is a twin-rotor electric motor provided with a relatively rotatable inner rotor 302 and outer rotor 304. As shown in FIG. 7, the inner rotor 302 is connected to the crank shaft 156 of the engine 150 and the outer rotor 304 to the drive shaft 112. The outer rotor 304 is supplied with electric power through a slip ring 306. The motor MG2 is also connected to the outer rotor 304 side shaft. The other configuration is similar to that shown in FIG. 1.

Power output from the engine 150 can be transmitted to the drive shaft 112 through the clutch motor CM. The clutch motor CM transmits power between the inner rotor 302 and outer rotor 304 through an electromagnetic coupling. In this case, when the rotation speed of the outer rotor 304 is lower than the rotation speed of the inner rotor 302, the clutch motor CM can regenerate electric power according to the sliding of the two. Conversely, the rotation speed of the inner rotor 302 can be increased and output to the drive shaft 112 by supplying the clutch motor CM with electric power. When the torque output from the engine 150 through the clutch motor CM does not match the required torque to be output from the drive shaft 112, torque can be compensated by the motor MG2.

The function of the motor MG2 is similar to that of the embodiment shown in FIG. 1. Therefore;, the invention can also be applied to the third embodiment.

It is understood that the invention is not limited to the aforementioned examples or embodiments, but can be executed in various other modes without departing from the scope thereof.

In short, though in the aforementioned first to third embodiments the invention is applied to a parallel hybrid method vehicle, it is also possible to apply the invention to a series hybrid method vehicle. This is because, in a series hybrid method as well, the motor can operate freely selecting the operating point since the power output from the motor can be output to the drive shaft with arbitrary rotation speed and torque.

What is claimed is:

1. A power output apparatus comprising:

a motor for outputting power;

a generator for generating electric power using at least part of the power output by the motor;

an electric motor operated such that the power output to a drive shaft becomes a desired power using generated electric power or electric power accumulated after generation of electric power; and a controller for obtaining power required of the motor based on a predetermined parameter and controlling an operating point of the motor based on the required power, wherein the controller sets beforehand a predetermined operation line lower in torque than a maximum torque line obtained by plotting a maximum torque for each rotation speed in a relation between the motor rotation speed and torque as a reference operation line for controlling the motor operating point, and controls to move the motor operating point along the reference operation line based on the obtained required power in a steady state; and controls the motor operating point such that power output from the motor becomes equal to the required power by increasing the motor torque while substantially maintaining the motor rotation speed irrespective of the reference operation line when the obtained required power increases.

2. A power output apparatus of claim 1, wherein the controller controls to return the motor operating point to the reference operation line while substantially maintaining the power output from the motor after having controlled the motor operating point such that the power output from the motor becomes equal to the required power by increasing the motor torque while substantially maintaining the motor rotation speed.

3. A power output apparatus of claim 2, wherein when the motor comprises an engine, operating point control means increases the motor torque by adjusting the opening of a throttle valve of the engine or the opening/closing timing of an intake valve.

4. A power output apparatus of claim 1, wherein when the motor comprises an engine, the controller increases the motor torque by adjusting the opening of a throttle valve of the engine or the opening/closing timing of an intake valve.

5. A hybrid vehicle comprising a power output apparatus according to claim 1, wherein a wheel is driven by power output to the drive shaft.

6. A method for controlling a motor operating point in a power output apparatus comprising a motor for outputting power, a generator for generating electric power using at least part of the power output by the motor, and an electric motor operated such that power output to a drive shaft becomes a desired power using generated electric power or electric power accumulated after generation of electric power, comprising steps of:

preparing a predetermined operation line lower in torque than a maximum torque line obtained by plotting a maximum torque for each rotation speed in a relation between the motor rotation speed and torque as a reference operation line for controlling the motor operating point;

obtaining power required of the motor based on a predetermined parameter;

controlling the motor operating point to move along the reference operation line based on the obtained required power; and controlling the motor operating point such that the power output from the motor becomes equal to the required power by increasing the motor torque while substantially maintaining the motor rotation speed irrespective of the reference operation line when the required power increases.

* * * * *